May 7, 1935.  E. M. KRAMER  2,000,289
BRAKE TESTING DEVICE.
Filed July 6, 1932   3 Sheets-Sheet 2

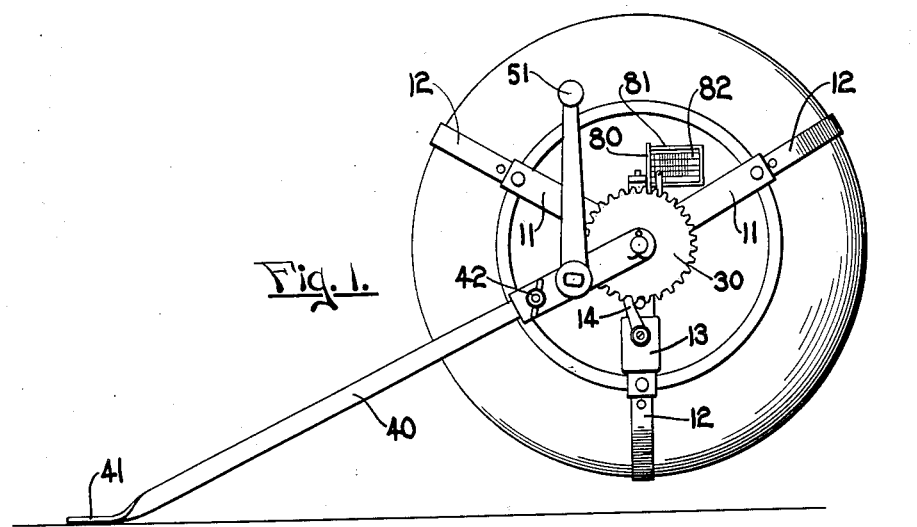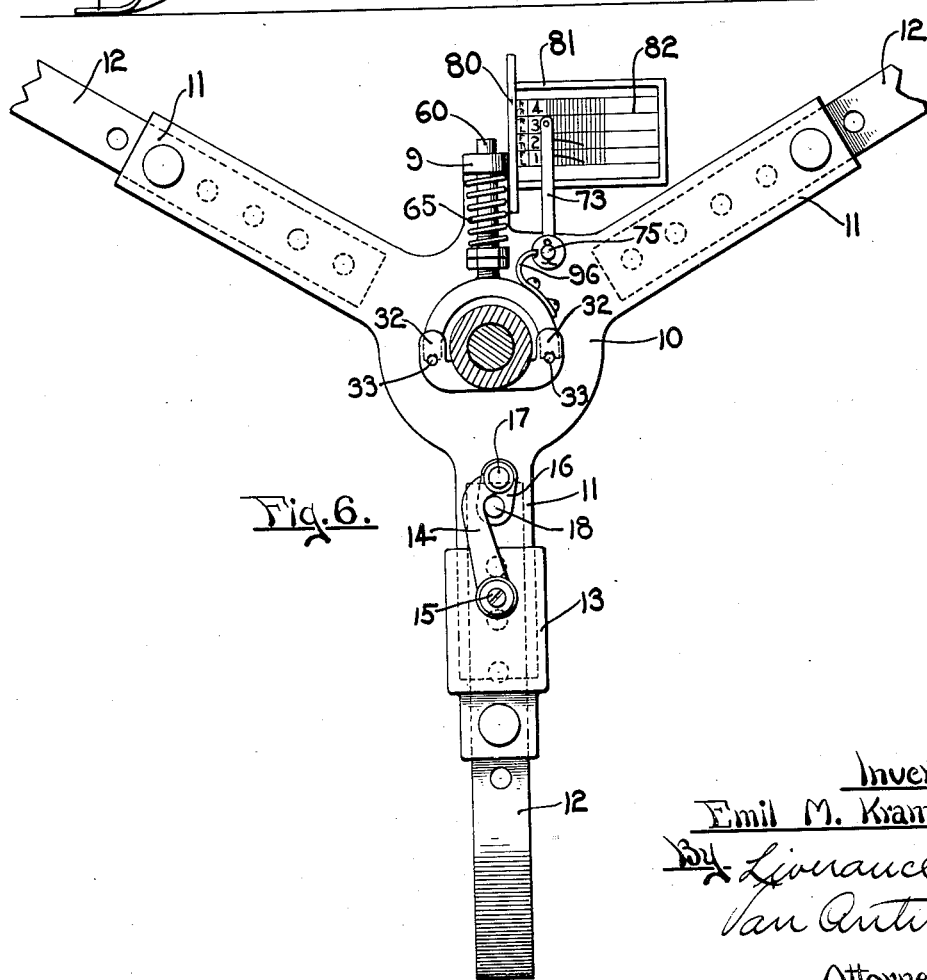

Inventor
Emil M. Kramer
By Liverance and VanAntwerp
Attorneys

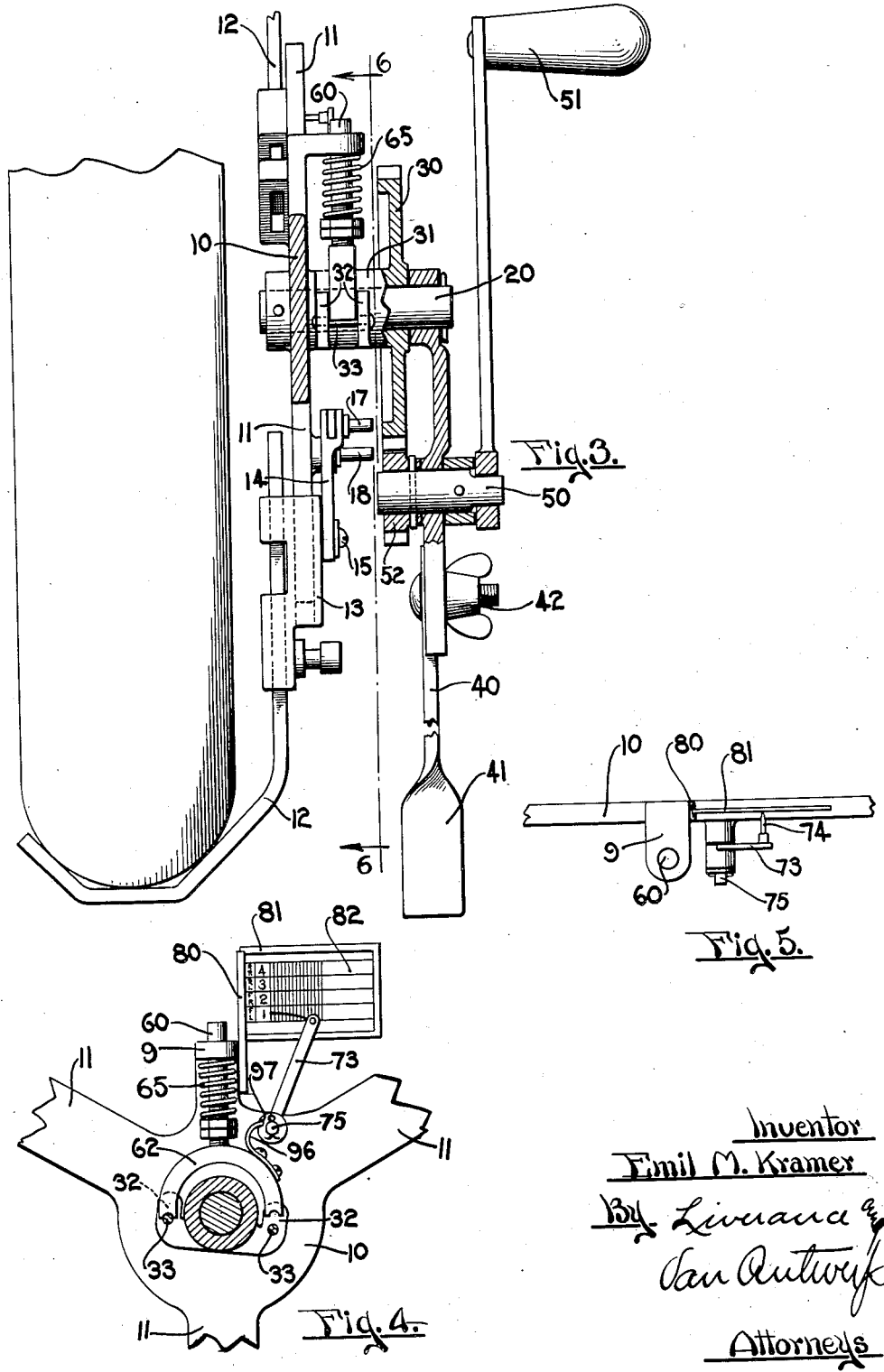

Patented May 7, 1935

2,000,289

UNITED STATES PATENT OFFICE 2,000,289

BRAKE TESTING DEVICE

Emil M. Kramer, Muskegon, Mich.

Application July 6, 1932, Serial No. 621,001

9 Claims. (Cl. 265—1)

This invention relates to a brake testing device.

Brake testing machines of this character hitherto have been relatively expensive to manufacture and it is a primary object of my invention to create a device which is relatively inexpensive to manufacture and yet which will be efficient and exact in service. Furthermore, my device is equally applicable to any of the wheels of an automobile and will give exact and visible data with respect thereto.

Briefly described, my invention consists of a spider shaped body plate which is attached to the chosen wheel of the automobile, said body having a shaft extending therefrom upon which manually operable gear means is mounted, this gear means being freely rotatable upon the shaft and operating through a slide or yoke member whereby the body plate, and consequently the wheel, is rotated. The slide or yoke member is displaced during this operation dependent upon the resistance offered by the wheel to turning and indicating means is connected to the slide or yoke member whereby the resistance is accurately plotted upon a card. This card member is slidably mounted whereby it serves to record the data relative to each of the four wheels of an automobile.

Other objects, advantages and meritorious qualities reside in the special construction and combination of the various elements forming the invention as more fully hereinafter described and claimed, reference being had to the accompanying drawings forming part hereof, wherein:—

Fig. 1 is a side view of my invention as applied to a wheel of an automobile, the wheel being raised from the ground.

Fig. 3 illustrates a modified form of my invention, this view being taken at right angles to the disclosure shown in Figs. 4 and 6, parts being broken away in order to expedite the showing.

Fig. 4 is a fragmentary view showing the device in operative position, the slide member being raised and the spring compressed whereby the recording finger is shown in recording position.

Fig. 5 is a plan view of Fig. 4.

Fig. 6 is a sectional view taken along the line 6—6 of Fig. 3.

Similar numerals refer to similar parts throughout the several views.

Figure 2:
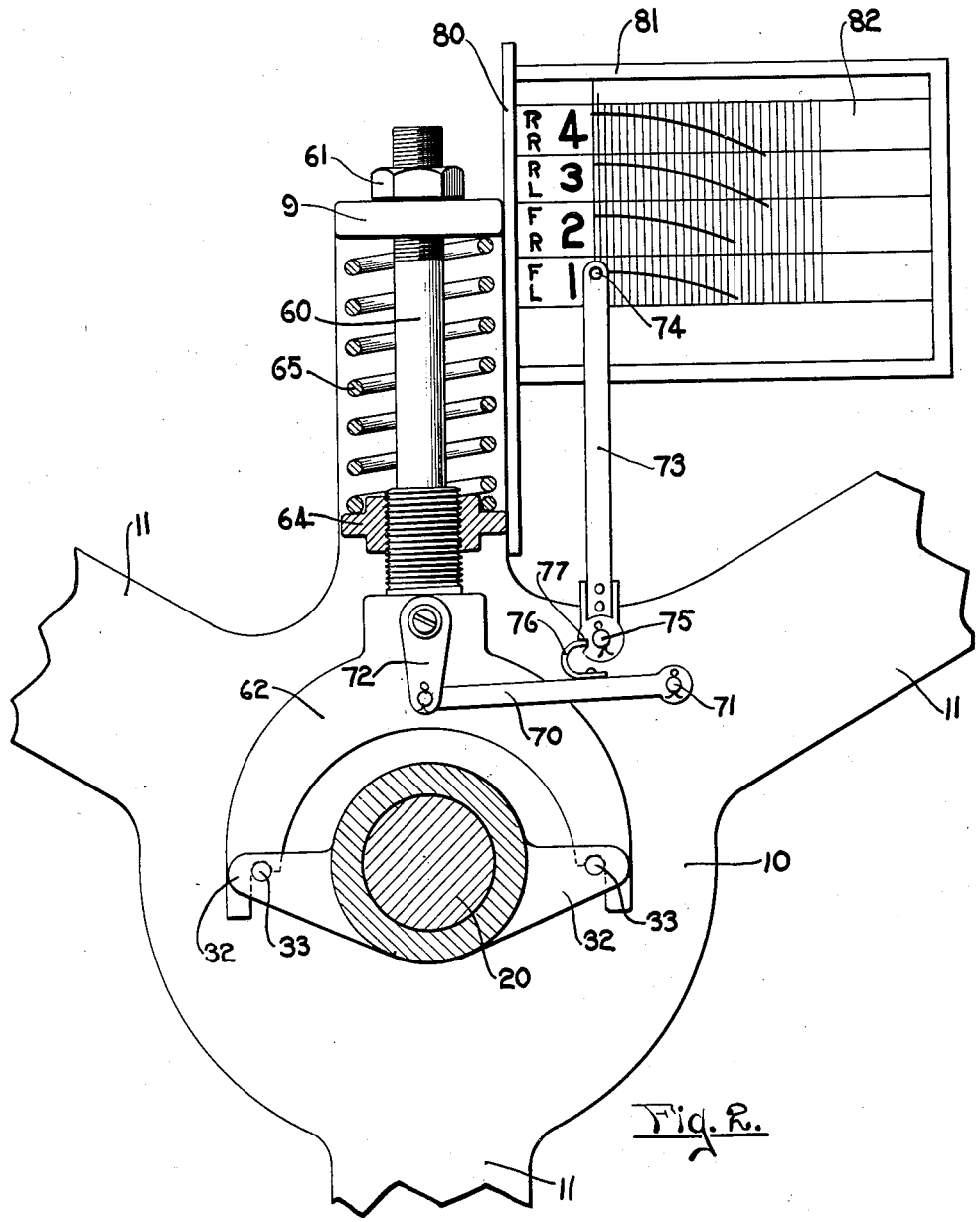
Fig. 2 is a cross sectional view through Fig. 1, this view being enlarged in order to clearly disclose this structure.

Referring now to Figs. 1 and 2, numeral 10 indicates a spider shaped body member which has arms 11 extending therefrom, these arms receiving the hook members 12 as clearly shown in Fig. 1, the hook members 12 being adjustably mounted whereby my device is applicable to wheels or tires of different diameters.

Referring now to Figs. 3 and 6, these views disclosing a modification, numerals 10, 11 and 12 are identical with the showing in Figs. 1 and 2. Also, the mounting of the lower hook 12, see Figs. 1 and 6, is exactly the same in both of these two modifications and hence a description of one will suffice for both. Hence, referring to Fig. 6 particularly, 13 indicates a block member which is recessed, see Fig. 3, to receive the hook member 12 and also the arm 11. The block member 13 has a curved link 14 attached thereto at 15, the other end of this link 14 being pivoted onto a second link 16 as at 17, this second link 16 being pivoted to the arm 11 as at 18. The pivots 17 and 18 extend outwardly for a short distance as clearly shown in Fig. 3.

The operation of the above structure is readily understood. The hook members 12 are applied to the tire and properly adjusted upon their respective arms 11 and the block 13 is released to its outer position. Next, a screw driver or the like is inserted between the pivots 17 and 18, see Fig. 3, and the toggle links 14 and 16 are shifted to the position shown in Fig. 6, this being a stable position, and hence the spider shaped body is firmly locked onto the tire of the wheel whereby the body member is positioned at the center of the wheel.

Referring now to both modifications, a shaft member 20 is attached to and extends from the body member 10 and a gear member 30, having an elongated hub 31, is freely rotatable upon this shaft 20. Lugs 32, having a pin 33 extending thereacross, see Figs. 2, 3 and 4, extend from opposite sides of this elongated hub 31 for a purpose which will presently be described.

A strut member 40, having a foot 41, see Fig. 1, is mounted upon the end of the shaft 20 and supports a stub shaft 50, which shaft has a crank 51 rigidly attached thereto, see Figs. 1 and 3, and also a pinion 52, this pinion meshing with the gear 30 previously described. Hence rotation of the pinion 52 by means of the crank 51, causes rotation of the gear member 30 and also the attached lug members 32 thereon. The strut member 40 is jointed as indicated at 42 for convenience in manufacture and in handling. The spider shaped body 10 has a boss 9 thereon, see Fig. 5, this boss 9 slidably receiving the slide or yoke member 60. As shown in Fig. 2, the slide member 60 has a stop nut 61 at its upper end whereby its downward movement is adjustable and is bifurcated at its lower end as at 62, this bifurcated portion resting upon the pins 33. A stop collar 64 is threaded onto the slide member 60 as clearly shown in Fig. 2, and a spring 65 is inserted between the collar 63 and the boss 9, this spring being under compression and hence maintaining the bifurcated end 62 of the slide member in contact with the pins 33 during normal position of the device. When, however, pressure is exerted to turn the wheel by means of the crank 51, pinion 52, gear 30, pins 33, slide member 60, and spider member 10 the spring is compressed more or less depending upon the friction of the brake which is attached to the wheel.

Referring to Fig. 2, the indicating means consists of a link 70 pivoted at 71 onto the body member 10, the other end of this link being pivotally attached to the element 72. An indicating finger 73 having a marking device 74 such as a pencil at its upper end, is pivoted at 75, and a curved spring element 76 rides in a notch 77 whereby movement of the link 70 upwardly will cause an outward movement of the marking device 74.

It is desired to point out that the rotation of the gear 30 is in different directions depending whether or not it is used upon the right hand or the left hand wheel of the automobile and hence the sliding member 60 will be shifted slightly laterally depending upon which wheel of the automobile the device is utilized. That is, the lower end 62 of the sliding member 60 will follow the arcuate path of the contacting pin 33. The link 70 operates in exactly the same direction regardless of the rotation and hence no error will be introduced thereby. In other words, the member 70 always moves upwardly about the pivot point 71 regardless of the direction of rotation of the wheel and hence identical movement will be produced in the indicating finger 73 and the resistance of the brake will be properly recorded.

A guideway or channel member 80 is attached to the body member 10 and receives a supporting frame 81 slidably therein. The supporting frame 81 in turn receives the indicating card 82, this card being ruled and marked as shown in Fig. 2. That is, the numerals 1 and 2 indicate the braking data for the front left and the front right wheels, respectively, while the numerals 3 and 4 indicate the data for the rear left and the rear right wheels, respectively. The frame 81, carrying the card 82, is adjusted so as to bring the proper space thereon opposite the indicating means. The modification shown in Figs. 3-6, inclusive, is very similar to the one already described, the principal difference being the elimination of the links 71 and 72. Referring to Figs. 4 and 6, especially, numeral 96 indicates the spring which is connected onto the lower end of the sliding member 60, this spring contacting directly with the notch 97 in the recording finger 73. Hence, upward movement of the slide member will cause rotation of the recording finger 73 to the right as is clearly shown in Fig. 4. Whenever the device is applied to the opposite wheel of the automobile, the pin 33 shown at the left in Fig. 4 will be spaced from the bifurcated end 62 of the sliding member 60 and the pin 33 at the right hand side thereof will be in contact. In this device the spring member 96 will move laterally somewhat due to the arcuate movement of the lower end of the sliding member and a very small error will be produced in the recording finger 73 but this is taken care of in any desired manner. In the modification shown in Figs. 1 and 2, this error is not present due to the links 71 and 72.

The operation is readily understood. The wheels of the automobile are lifted until they are free of the ground and then the wheels are tested by applying my brake testing device thereto. The brake pedal is pushed downwardly to any desired degree and consequently the brakes on the wheels become more or less tight. Next, my device is placed upon a wheel and the crank member 51 rotated in the proper direction, the strut 40 bearing against the ground during this rotation and the spring 65 being compressed proportionately to the resistance encountered by the wheel during its turning movement. The indicating finger 73 moves to the right, see Fig. 2, during this operation and a mark is made as shown. Next, the card 82 is adjusted and the other wheels of the automobile are tested and the friction between the brake bands and their several wheels adjusted until finally the adjustment has been made so that the wheels are in exact adjustment as shown in Fig. 2. That is, the front wheels are adjusted equally and do not lock quite as readily as the rear wheels.

Having thus revealed this invention, I claim as new and desire to secure the following combinations and elements, or equivalents thereof, by Letters Patent of the United States.

1. A brake testing device of the class described comprising, a spider shaped body having three arms extending radially therefrom, hook members adjustably mounted on each of said arms, said hook members adapted to be cooperatively associated with a wheel of an automobile, a shaft extending from said spider shaped body in prolongation with the axis of the said wheel, a gear having an elongated hub mounted upon said shaft, sets of lugs extending from the elongated hub at opposite sides thereof, a pin extending between each set of lugs, an elongated slide member, bifurcated portions on the slide member partly encircling the hub and bearing against the said pins, means for mounting the elongated slide member upon the said spider shaped body, spring means for normally maintaining said bifurcated portions against the said pins, indicating means attached to and associated with said slide member, a strut member pivoted upon the shaft which extends from the spider shaped body, a second shaft extending through said strut, a pinion mounted upon said second shaft and engaging with the said gear, and means for rotating the said pinion.

2. A brake testing device of the class described comprising, a spider shaped body member having three radially extending arms extending therefrom, detachable means connected to the ends of the three arms for engagement with the outer periphery of a wheel, a shaft extending from the spider shaped body member in prolongation of its axis, means mounted upon said shaft so as to be rotated thereon, said means including a hub portion having lugs at either side thereof, pins extending through said lugs, an elongated member slidably mounted upon said spider shaped member and having one end bifurcated to cam against the said pins, spring means normally pushing said slide member against the said pins, and recording means attached to said slide member.

3. A brake testing device of the class described adapted for use on any of the four wheels of an automobile or the like, comprising, a spider shaped body having arms extending therefrom, hook members on said arms adapted for contact with the wheel upon which the device is mounted, a shaft extending from said spider shaped body, manually operable rotatable means mounted upon said shaft, sliding means mounted upon said spider shaped body, spring means for pushing said sliding means toward the manually rotatable means, lugs upon said manually rotatable means and adapted to contact with the said sliding means regardless of the direction of rotation of the manually rotatable means, and recording means attached to said sliding means for the purpose described.

4. In combination, a body member, means to mount the said body member upon an automobile wheel, a shaft extending from said body member, a gear having an elongated hub mounted upon said shaft so as to freely rotate thereon, protuberances extending from said elongated hub at opposite sides thereof, elongated means movably mounted upon said body member, said means having a bifurcated end adapted to contact against said protuberances, spring means associated with said movable means adapted to push the bifurcated end thereof into close relationship with said protuberances, an indicating finger movably mounted upon said body member, means extending from said slide member and cooperating with said finger to move the same whenever said movable member is moved against said spring member, and means including a pinion meshing with said gear member whereby the gear member may be rotated and one or the other of said protuberances pushed against the bifurcated end of the movable member for the purpose described.

5. In combination, a body member rigidly attached to a wheel of an automobile whereby it moves therewith, means rotatably mounted upon said body member, manually operated means whereby the first mentioned means may be rotated in either direction, a sliding member mounted upon said body member adapted to be slid radially of said wheel in a single direction regardless of the direction of rotation of the wheel, a single spring means for returning the sliding member to its normal position, a recording finger pivoted onto the body member, a chart mounted on the body member and associated with the recording finger and means cooperatively associated between the recording finger and the sliding member whereby the movement of the sliding member is transmitted to the recording finger.

6. In a brake testing device, a body member mounted in prolongation with the axis of the wheel, arms attached to the body member whereby the body member is attached to and carried by the wheel, a crank for manually operating the wheel, a gear associated with the crank and yielding means whereby power is transmitted from the gear to the wheel and recording means for recording the force exerted to turn the wheel, said recording means being located upon and carried by the said body member.

7. A brake testing device of the class described comprising, a spider shaped body having three arms extending radially therefrom, hook members adjustably mounted on each of said arms, said hook members adapted to be cooperatively associated with a wheel of an automobile, a shaft extending from said spider shaped body in prolongation with the axis of the said wheel, a gear having an elongated hub mounted upon said shaft, sets of lugs extending from the elongated hub at opposite sides thereof, a pin extending between each set of lugs, an elongated slide member, bifurcated portions on the slide member partly encircling the hub and bearing against the said pins, means for mounting the elongated slide member upon the said spider shaped body, spring means for normally maintaining said bifurcated portions against the said pins, indicating means attached to and associated with said slide member, and means for rotating said gear.

8. In an automobile wheel having a brake thereon, the combination of, a body member, means for rigidly mounting the body member at the outer side of said wheel to be bodily carried thereby in substantial alinement with the axis of the said wheel, a movable member mounted upon said body member, a single spring means for holding the movable member in normal position, means, including a rotatable gear, associated with said movable member to displace the same, a recording finger pivoted onto the said body member, means located between and contacting with the said finger and the said movable means whereby the finger is moved in proportion to the amount of force needed to turn the wheel, and chart means located under the recording finger for the purpose described, said chart means being mounted upon the body member.

9. In combination, a body member, means to mount the said body member upon an automobile wheel, a hub mounted upon said shaft so as to freely rotate thereon, protuberances extending from said hub at the opposite sides thereof, elongated means movably mounted upon said body member, said means having a bifurcated end adapted to contact against said protuberances, yieldable means adapted to push the bifurcated end thereof into close relationship with said protuberances, a movable indicating finger, means for transmitting rotation to said wheel through said elongated means by applying a force to rotate the hub, means connecting said elongated means to said indicating means whereby the force required to turn the wheel will be indicated.

EMIL M. KRAMER.